United States Patent
Seki et al.

(10) Patent No.: US 9,666,867 B2
(45) Date of Patent: May 30, 2017

(54) ALUMINUM ALLOY FOIL FOR ELECTRODE COLLECTOR AND PRODUCTION METHOD THEREFOR

(75) Inventors: Masakazu Seki, Chiyoda-ku (JP); Satoshi Suzuki, Chiyoda-ku (JP); Kenji Yamamoto, Chuo-ku (JP); Tomohiko Furutani, Chuo-ku (JP)

(73) Assignees: UACJ CORPORATION, Tokyo (JP); UACJ FOIL CORPORATION, Tokyo (JP)

(*) Notice: Subject to any disclaimer, the term of this patent is extended or adjusted under 35 U.S.C. 154(b) by 284 days.

(21) Appl. No.: 14/235,737

(22) PCT Filed: Jul. 29, 2011

(86) PCT No.: PCT/JP2011/067476
§ 371 (c)(1),
(2), (4) Date: Jan. 28, 2014

(87) PCT Pub. No.: WO2013/018161
PCT Pub. Date: Feb. 7, 2013

(65) Prior Publication Data
US 2014/0162085 A1  Jun. 12, 2014

(51) Int. Cl.
*H01M 4/66* (2006.01)
*C22C 21/00* (2006.01)
*C22F 1/04* (2006.01)
*B23K 35/02* (2006.01)
*B21B 1/02* (2006.01)
*H01G 11/68* (2013.01)
*H01M 10/052* (2010.01)

(52) U.S. Cl.
CPC ............. *H01M 4/662* (2013.01); *B21B 1/026* (2013.01); *B23K 35/0233* (2013.01); *C22C 21/00* (2013.01); *C22F 1/04* (2013.01); *H01G 11/68* (2013.01); *H01M 10/052* (2013.01); *Y02E 60/13* (2013.01); *Y02T 10/7022* (2013.01); *Y10T 428/12431* (2015.01)

(58) Field of Classification Search
CPC ........... H01M 4/662; C22C 21/00; C22F 1/04
USPC ....................................................... 429/245
See application file for complete search history.

(56) References Cited

FOREIGN PATENT DOCUMENTS

| | | | |
|---|---|---|---|
| JP | 58-221265 | A | 12/1983 |
| JP | 05-247609 | A | 9/1993 |
| JP | 11-162470 | A | 6/1999 |
| JP | 11162470 | A * | 6/1999 |
| JP | 2002-129269 | A | 5/2002 |
| JP | 2004-207117 | A | 7/2004 |
| JP | 2008-095142 | A | 4/2008 |
| JP | 2008-150651 | A | 7/2008 |
| JP | 2009-019248 | A | 1/2009 |
| JP | 2009-129248 | A | 1/2009 |
| JP | 2010-043333 | A | 2/2010 |
| JP | 2010-150637 | A | 7/2010 |
| JP | 2011-089196 | A | 5/2011 |
| WO | 2012/086448 | A1 | 6/2012 |

OTHER PUBLICATIONS

Aluminium Handbook, issued by Japan Aluminium Association, Jan. 31, 2007, 4 pages. English translation of relevant portions of Aluminium Handbook in Japanese Information Statement, filed herewith.
Ashizawa, K., and K. Yamamoto, "Aluminum Foil for Lithium-Ion Battery," Furukawa-Sky Review No. 5, Apr. 2009, 6 pages.
Japanese Information Statement, submission of reason details, filed by a third party Apr. 24, 2015, 12 pages.
International Search Report mailed Oct. 25, 2011, issued in corresponding International Application No. PCT/JP2011/067476, filed Jul. 29, 2011, 2 pages.
Japanese Office Action mailed Jul. 7, 2015, issued in corresponding Japanese Application No. 2013-526630, filed Jun. 24, 2013, 4 pages.

* cited by examiner

*Primary Examiner* — Weiping Zhu
(74) *Attorney, Agent, or Firm* — Christensen O'Connor Johnson Kindness PLLC

(57) ABSTRACT

An object of the present invention is to provide an aluminum alloy foil for an electrode current collector, the foil having a high strength after the drying step while keeping a high electrical conductivity. Disclosed is a method for manufacturing an aluminum alloy foil for electrode current collector, including: maintaining an aluminum alloy ingot comprising 0.03 to 0.1% of Fe, 0.01 to 0.1% of Si, 0.0001 to 0.01% of Cu, 0.005% or less of Mn, with the rest being Al and unavoidable impurities, at 550 to 620° C. for 1 to 20 hours, and subjecting the resulting ingot under a hot rolling with a starting temperature of 500° C. or higher and an end-point temperature of 255 to 300° C.

2 Claims, No Drawings

ALUMINUM ALLOY FOIL FOR ELECTRODE COLLECTOR AND PRODUCTION METHOD THEREFOR

TECHNICAL FIELD

The present invention relates to electrode current collectors used for secondary batteries, electric double-layer capacitors, lithium-ion capacitors, etc., and more particularly to aluminum alloy foils used for a positive electrode material of lithium-ion secondary batteries. The present invention further relates to an aluminum alloy foil used for a negative electrode material of lithium-ion secondary batteries.

BACKGROUND ART

Lithium-ion secondary batteries with high energy densities have been used as power sources for portable electronics such as a mobile phone and a notebook computer.

An electrode member of a lithium-ion secondary battery includes a positive electrode plate, a separator, and a negative electrode plate. Regarding a positive electrode material, an aluminum alloy foil has been used as a support, having excellent electrical conductivity and less heat generation without affecting electrical efficiency of a secondary battery. Here, aluminum alloy of JIS 1085 and JIS3003 have been generally used. An active material having a lithium-containing metal oxide such as $LiCoO_2$ as a chief component is applied on a surface of the aluminum alloy foil. Its production process includes: applying an active material with a thickness of about 100 μm on both sides of an aluminum alloy foil with a thickness of about 20 μm; and drying the active material to remove a solvent therefrom. Further, in order to increase the density of the active material, compression forming is performed with a pressing machine (hereinafter, this step of compression forming performed with a pressing machine is referred to as press working). The positive electrode plate as so manufactured, a separator, and a negative electrode plate are stacked, and then the resulting stack is wound. After a shaping process is performed so as to encase the stack, it is encased.

An aluminum alloy foil used for a positive electrode material of a lithium-ion secondary battery has several problems that cuts occur during application of an active material and that ruptures occur at a bending portion during winding. Thus, a higher strength is required. At a drying step after the application of the active material (hereinafter referred to as "drying step"), heat treatment is carried out at about 100 to 180° C. Accordingly, a lower strength after the drying step is likely to generate middle waviness during press working. This induces wrinkles during winding, which reduces adhesion between the active material and the aluminum alloy foil. Besides, a rupture is likely to occur during a slitting process. When the adhesion between the active material and a surface of the aluminum alloy foil decreases, their detachment is facilitated during repeated operation of discharge and charge. Unfortunately, this causes its battery capacity to decrease.

Recently, a high electrical conductivity has been required for an aluminum alloy foil used for a positive electrode material of a lithium-ion secondary battery. What is meant by the electrical conductivity refers to physical property indicating how easily electricity is conducted in a substance. The higher the electrical conductivity is, the more easily the electricity is conducted. Lithium-ion secondary batteries used for automobiles and/or electric tools necessitate a higher output characteristic than lithium-ion secondary batteries used for consumer-use mobile phones and/or notebook computers. When a large current flows, a lower electrical conductivity causes internal resistance of a battery to increase. Consequently, this reduces its output voltage.

An aluminum alloy foil whose Al purity is 99% or more has been used as an alloy foil for a lithium-ion secondary battery, which requires a high electrical conductivity. However, the aluminum alloy foil whose Al purity is 99% or more makes it difficult to improve its strength because the foil contains a fewer amounts of other elements. Specifically, because there are fewer fine precipitates or solid-solution elements that can suppress their dislocation movement during heat treatment, a decrease in the strength becomes large.

That is, as for materials for electrode current collectors, in particular, as for electrode materials for lithium-ion secondary batteries, it has been sought to use an aluminum alloy foil having a higher strength after final cold rolling and a higher strength after heating during a drying step while keeping a higher electrical conductivity.

Patent Literature 1 discloses an aluminum alloy foil with a tensile strength of 98 MPa or more, which foil is used for a battery collector. Patent Literature 1, however, is silent on its strength after a drying step in a manufacturing process of a positive electrode material for a lithium-ion secondary battery.

Patent Literature 2 discloses an aluminum alloy foil with a tensile strength of 160 MPa or more, which foil is used for an electrode current collector of a lithium-ion secondary battery. However, the strength after heat treatment, which simulates a drying step, is low. This strength is insufficient for preventing wrinkles during winding and ruptures during a slitting process because middle waviness occurs during press working.

Patent Literature 3 sets forth a method for preventing detachment from an active material without inducing plastic deformation during press working by increasing the strength of the aluminum alloy foil. However, the alloy used contains Mn, Cu, and Mg as principal elements. Therefore, it is impossible to achieve a high electrical conductivity.

Patent Literature 4 discloses an aluminum alloy sheet, the solid solution content of Fe being less than 50 ppm, the thickness of the sheet being 0.1 to 2 mm, and the tensile strength being 145 to 200 MPa. However, the thickness of the sheet being such prohibits the application to electrode current collector. Further, since the solid solution content of Fe is low, the strength of the alloy extremely decreases when heat treatment at 120 to 160° C. is performed for 15 minutes to 24 hours.

CITATION LIST

Patent Literature

[Patent Literature 1] JPH11-162470A
[Patent Literature 2] JP2010-150637A
[Patent Literature 3] JP2008-150651A
[Patent Literature 4] JP2002-129269A

SUMMARY OF INVENTION

Technical Problem

As mentioned above, conventional techniques have failed to obtain an aluminum alloy foil for an electrode current collector of electrodes having sufficient properties of both the strength and the electrical conductivity.

The present invention has been made by taking the afore-mentioned circumstances into consideration. An object of the present invention is to provide an aluminum alloy foil for an electrode current collector, the foil having a high strength after the drying step while keeping a high electrical conductivity.

Solution to Problem

The present inventors have made an investigation regarding the aluminum alloy foil used for the positive electrode materials of the lithium-ion secondary batteries. Accordingly, the present inventors found that high electrical conductivity and high strength after the heat treatment during the drying step after the application of the active material can be maintained, by controlling the solid solution content and precipitation content for their elements, which is achieved by regulating the content of the component within an appropriate range and by optimizing the temperature applied during the homogenization treatment of the ingot and during the hot rolling.

That is, the first aspect of the present invention is an aluminum alloy foil for electrode current collector, comprising:

0.03 to 0.1 mass % (hereinafter referred to as %) of Fe, 0.01 to 0.1% of Si, 0.0001 to 0.01% of Cu, 0.005% or less of Mn, with the rest consisting of Al and unavoidable impurities, wherein tensile strength of the aluminum alloy foil is 180 MPa or higher, 0.2% yield strength of the aluminum alloy foil is 160 MPa or higher, and electrical conductivity of the aluminum alloy foil is 60% IACS or higher.

The second aspect of the present invention is the aluminum alloy foil for electrode current collector as described above, wherein solid solution content of Fe is 100 ppm or higher,
solid solution content of Si is 80 ppm or higher, and
solid solution content of Cu is 1 ppm or higher.

The third aspect of the present invention is the aluminum alloy foil for electrode current collector as described above, wherein the tensile strength and the 0.2% yield strength after performing a heat treatment of 15 minutes to 24 hours at 120° C. to 160° C., is 170 MPa or higher and 150 MPa or higher, respectively.

The fourth aspect of the present invention is a method for manufacturing the aluminum alloy foil for electrode current collector as described above, comprising the steps of:

maintaining an aluminum alloy ingot comprising 0.03 to 0.1% of Fe, 0.01 to 0.1% of Si, 0.0001 to 0.01% of Cu, 0.005% or less of Mn, with the rest consisting of Al and unavoidable impurities, at 550 to 620° C. for 1 to 20 hours, and subjecting the resulting ingot under a hot rolling with a starting temperature of 500° C. or higher and an end-point temperature of 255 to 300° C.

The first through the fourth aspects of the present invention can be combined as necessary.

The following points were considered to be particularly important when achieving the present invention. That is, three temperature conditions of (1) homogenization heating treatment shall be carried out at 550 to 620° C. for 1 to 20 hours, (2) the starting temperature of the hot rolling shall be 500° C. or higher, (3) the end-point temperature of the hot rolling shall be 255 to 300° C. need be satisfied. When any one of these temperature condition cannot be met, an aluminum alloy foil for electrode current collector having superior characteristics in both of the strength and the electrical conductivity cannot be obtained. It became apparent that only when these temperature conditions are met, Fe, Si, and Cu in the aluminum alloy foil forms sufficient solid solution, thereby providing an aluminum alloy foil with high strength and high electrical conductivity.

Among these three conditions, the most important condition is to keep the end-point temperature of the hot rolling in the range of 255 to 300° C. When the end-point temperature of the hot rolling is not in this range, decrease in production efficiency of the aluminum foil and decrease in strength of the aluminum foil occur.

Advantageous Effects of Invention

According to the present invention, an aluminum alloy foil for electrode current collector, such as an aluminum alloy foil for lithium ion batteries, having high electrical conductivity as well as high strength after drying process can be provided. Such aluminum alloy foil is resistant from generation of middle waviness during press working, thereby preventing detachment of the active material and raptures during a slitting process.

DESCRIPTION OF EMBODIMENTS

<Composition of Aluminum Alloy Foil>

The aluminum alloy foil for lithium ion batteries according to the present invention comprises: 0.03 to 0.1% of Fe, 0.01 to 0.1% of Si, 0.0001 to 0.01% of Cu, 0.005% or less of Mn, with the rest consisting of Al and unavoidable impurities.

Si is an element that increases strength by addition thereof, and 0.01 to 0.1% of Si is included. When the additive amount of Si is less than 0.01%, there is almost no contribution to the improvement in strength. In addition, Si is included in a common Al base metal as impurities. As a result, in order to restrict the amount to less than 0.01%, a high-purity base metal should be used. This is difficult to achieve in view of economic reasons. In contrast, when the additive amount of Si exceeds 0.1%, it is unfavorable since it becomes difficult to maintain high electrical conductivity.

Fe is an element that increases strength by addition thereof, and 0.03 to 0.1% of Fe is included. When the additive amount of Fe is less than 0.03%, there is no contribution to the improvement in strength. In contrast, when the additive amount of Fe exceeds 0.1%, it is unfavorable since it becomes difficult to maintain high electrical conductivity.

Cu is an element that increases strength by addition thereof, and 0.0001 to 0.01% of Cu is included. When the additive amount of Cu is less than 0.0001%, there is almost no contribution to the improvement in strength. This would require the use of a high-purity base metal, and thus it is difficult to achieve in view of economic reasons. In contrast, when the additive amount of Cu exceeds 0.01%, it is unfavorable since it becomes difficult to maintain high electrical conductivity.

The amount of Mn contained is controlled to be 0.005% or less, since even when only a minute amount of Mn is contained in the aluminum alloy, it forms solid solution in the aluminum alloy and leads to large decrease in electrical conductivity. When the amount of Mn contained exceeds 0.005%, it becomes difficult to maintain high electrical conductivity.

With regard to other points, a material of an embodiment of the present invention contains unavoidable impurities such as Cr, Ni, Zn, Mg, Ti, B, V, and/or Zr. An amount of each of the unavoidable impurities is preferably 0.02% or less, and a total amount thereof is preferably 0.15% or less.

<Content of Solid Solution Formed in Aluminum Alloy>

Solid solution of Fe formed in aluminum improves the strength of the aluminum. The content is preferably 100 ppm or more. When the content of Fe is less than 100 ppm, there is little contribution to the improvement in strength. There is no particular upper limit for the content of Fe, however, it is preferably 300 ppm or less since the electrical conductivity decreases when the content of Fe becomes too large.

Solid solution of Si formed in aluminum improves the strength of the aluminum. The content is preferably 80 ppm or higher. When the content of Si is less than 80 ppm, there is little contribution to the improvement in strength, and it is also economically difficult since it would require the use of bare metal with high purity. There is no particular upper limit for the solid solution content of Si, however, if the additive amount of Si is in the range of 0.01 to 0.1%, it is preferable in view of the improvement in strength that as much as possible Si among the amount added forms the solid solution.

Solid solution of Cu formed in aluminum improves the strength of the aluminum. The content is preferably 1 ppm or more. When the content of Cu is less than 1 ppm, there is little contribution to the improvement in strength, and it is also economically difficult since it would require the use of bare metal with high purity. There is no particular upper limit for the solid solution content of Cu, however, if the additive amount of Cu is in the range of 0.0001 to 0.01%, it is preferable in view of the improvement in strength that as much as possible Cu among the amount added forms the solid solution.

<Original Sheet Strength>

With regard to an aluminum alloy primarily containing Fe, Si and Cu, when the temperature conditions for the homogenization treatment and the hot rolling are optimized, allowing each of the elements to form solid solution as much as possible, dislocation movement can be reduced, thereby achieving higher strength. Further, as the content of the solid solution increase, work hardening during processing increase. Accordingly, strength of the aluminum alloy foil can be further improved by cold rolling and foil rolling.

Tensile strength of an original sheet after final cold rolling should be 180 MPa or higher. Then, 0.2% yield strength thereof should be 160 MPa or higher. In the case where the tensile strength is less than 180 MPa and in the case where the 0.2% yield strength is less than 160 MPa, the strength is insufficient. Consequently, tension imposed during application of an active material is likely to produce cuts and cracks. In addition, the above causes defects such as middle waviness, exerts adverse effects on its productivity, and is thus not preferred.

<Strength After Heat Treatment>

A step of manufacturing a positive electrode plate includes a drying step after application of an active material so as to remove a solvent from the active material. At this drying step, heat treatment is carried out at a temperature of about 100 to 180° C. This heat treatment may cause a change in mechanical property because an aluminum alloy foil is softened. Thus, the mechanical property of the aluminum alloy foil after the heat treatment is critical. During heat treatment at 100 to 180° C., external heat energy activates dislocation and facilitates its movement. This decreases strength in the course of recovery thereof. In order to prevent the strength decrease in the course of the recovery during the heat treatment, reducing the dislocation movement by using solid-solution elements or precipitates in the aluminum alloy is effective. In an aluminum alloy primarily containing Fe, Si, and Cu, in particular, a solid solution content of Fe has a large effect. Specifically, more Fe can form solid solution by increasing a temperature of homogenizing treatment of an ingot. Then, during hot rolling, the resulting Fe solid solution should not be subject to precipitation as much as possible, and an increased solid solution content should be maintained. This can reduce the strength decrease after the heat treatment.

In the present invention, in order to achieve tensile strength of 170 MPa or higher and 0.2% yield strength of 150 MPa or higher after heat treatment at 120° C. for 24 hours, at 140° C. for 3 hours, or at 160° C. for 15 minutes, conditions for the homogenizing treatment and for the hot rolling are regulated. If the tensile strength is less than 170 MPa or the 0.2% yield strength is less than 150 MPa after the heat treatment, middle waviness is likely to occur during press working after the drying step. This causes wrinkles during winding, and readily generates detachment of an active material and ruptures during a slitting process. The above strengths are therefore not preferred.

<Electrical Conductivity>

Electrical conductivity should be 60% IACS or higher. The electrical conductivity represents a solid solution state of a solute element. An electrode current collector according to an embodiment of the present invention may be used for a lithium-ion secondary battery. In that case, when a discharge rate exceeds 5 C, which is a high current level, electrical conductivity of less than 60% IACS is not preferable because its battery capacity decrease. Note that the "1° C." means a current level to complete, in one hour, the discharge from a cell having the nominal capacity value when a constant current at the current level is discharged from the cell.

<Method for Manufacturing Aluminum Alloy Foil>

The following steps are used to manufacture an aluminum alloy ingot having the above alloy composition according to an embodiment of the present invention.

The aluminum alloy having the above composition can be used to prepare an ingot after casting in accordance with a common procedure. Examples of the procedure used for their manufacturing include semi-continuous casting and continuous casting. The aluminum alloy cast ingot is subjected to homogenizing treatment at 550 to 620° C. for 1 to 20 hours.

When the temperature of the homogenizing treatment is lower than 550° C. or the holding time is less than 1 hour, elements such as Si and Fe cannot form solid solution, the strength before and after the subsequent heat treatment is lowered. The above condition is thus not preferred. When the temperature exceeds 620° C., the ingot melts locally. In addition, a tiny amount of hydrogen gas mixed in during casting appears on the surface, thereby readily causing swelling on the material surface. The above condition is thus not preferred. Also, when the homogenizing treatment period exceeds 20 hours, the effect of the solid solution becomes saturated, leading to decrease in productivity and increase in cost.

The above homogenizing treatment is followed by hot rolling, cold rolling, and foil rolling to produce an aluminum alloy foil with a thickness of 6 to 30 μm. The hot rolling starts at a temperature of 500° C. or higher after the homogenizing treatment. When the hot rolling has a starting temperature of lower than 500° C., a precipitation amount of elements such as Si and Fe increases. Consequently, it is difficult to preserve a solid solution content to improve its strength. The solid solution content of Fe, in particular, has a large effect on maintenance of high strength. When the temperature ranges from 350 to 500° C., Fe is susceptible to precipitation as $Al_3Fe$ or an intermetallic compound for Al—Fe—Si series. Thus, a time going through this temperature range should be as short as possible. During the hot rolling, in particular, a time going through a temperature range from 350 to 500° C. is preferably within 20 minutes.

The end-point temperature of the hot rolling may be 255 to 300° C. The end-point temperature at the time of the hot rolling can be determined by changing a line speed and by thus adjusting processing heat and cooling conditions. Note that a hot-rolled aluminum sheet is wound and cooled as a coil at the outlet side of a hot roller.

In order to set the end-point temperature of the hot rolling to be lower than 255° C., the line speed should be markedly decreased to prevent occurrence of the processing heat. This is not preferred because the productivity decreases. When the end-point temperature of the hot rolling exceeds 300° C., aluminum recrystallization proceeds inside the coil during cooling. Accordingly, accumulated strain is reduced and the strength is lowered. More preferably, the temperature range is set to be from 255 to 285° C.

After the hot rolling, cold rolling is performed. Here, it is preferable not to perform intermediate annealing before or in the midst of the cold rolling. When intermediate annealing is performed, the strain accumulated during the hot rolling and the cold rolling before the intermediate annealing is released, resulting in low strength. In addition, Fe which have formed solid solution during the homogenizing treatment and the hot rolling precipitate. Accordingly, the solid solution content would decrease, and the strength after heat treatment at 120 to 160° C. for 15 minutes to 24 hours would also decrease.

After the final cold rolling, the aluminum alloy foil should have a thickness of 6 to 30 μm. When the thickness is less than 6 μm, pin holes are likely to occur during foil rolling. This situation is not preferable. When the thickness exceeds 30 μm, the volume and weight of an electrode current collector increase and the volume and weight of an active material decrease in the same occupied space. In the case of a lithium-ion secondary battery, the above is not preferable because a battery capacity decreases.

EXAMPLES

The present invention will be explained in details by referring to the following Examples and Comparison Examples. The Examples, however, are just examples, and thus the present invention shall not be limited to the Examples.

Aluminum alloys having compositions designated in Table 1 were subjected to casting using semi-continuous casting to prepare ingots with a thickness of 500 mm. Next, those ingots were subjected to surface finishing, followed by homogenizing treatment under conditions designated in Table 1. Then, hot rolling was performed to produce sheets with a thickness of 3.0 mm. In Examples 1 to 8 and 10 to 12, intermediate annealing was not performed, while cold rolling and foil rolling were performed continuously. In this manner, aluminum alloy foil with a thickness of 12 μm was obtained. In Example 9, hot rolling was performed, followed by cold rolling to obtain an aluminum foil with a thickness of 0.8 mm, and then intermediate annealing was performed at 490° C. for 4 hours. Subsequently, cold rolling and foil rolling was performed continuously, and aluminum alloy foil with a thickness of 12 μm was obtained. In Comparison Examples 13 to 21, aluminum alloy foils were obtained by a production process similar to those of the above-mentioned Examples.

TABLE 1

| | | Chemical Component (mass %) | | | | Homogenizing Treatment Condition | | Hot Rolling Condition | | Intermediate Annealing Condition | Foil Thickness (μm) |
|---|---|---|---|---|---|---|---|---|---|---|---|
| | No. | Si | Fe | Cu | Mn | Al and Unavoidable Impurities | Temperature (° C.) | Period (hr) | Starting Temperature (° C.) | End-point Temperature (° C.) | |
| Example | 1 | 0.01 | 0.07 | 0.0026 | 0.0008 | Rest | 620 | 3 | 550 | 255 | None | 12 |
| | 2 | 0.07 | 0.03 | 0.0017 | 0.0005 | Rest | 620 | 3 | 550 | 255 | None | 12 |
| | 3 | 0.08 | 0.06 | 0.0001 | 0.0006 | Rest | 620 | 3 | 550 | 255 | None | 12 |
| | 4 | 0.02 | 0.05 | 0.0012 | 0.0009 | Rest | 610 | 6 | 550 | 270 | None | 12 |
| | 5 | 0.06 | 0.07 | 0.0066 | 0.0011 | Rest | 610 | 6 | 550 | 270 | None | 12 |
| | 6 | 0.05 | 0.06 | 0.0028 | 0.0008 | Rest | 580 | 6 | 530 | 280 | None | 12 |
| | 7 | 0.05 | 0.06 | 0.0028 | 0.0008 | Rest | 580 | 6 | 530 | 295 | None | 12 |
| | 8 | 0.06 | 0.08 | 0.0074 | 0.0006 | Rest | 580 | 6 | 530 | 280 | None | 12 |
| | 9 | 0.06 | 0.08 | 0.0074 | 0.0005 | Rest | 580 | 6 | 530 | 280 | 490° C. × 4 hr | 12 |
| | 10 | 0.10 | 0.04 | 0.0088 | 0.0013 | Rest | 550 | 10 | 500 | 290 | None | 12 |
| | 11 | 0.02 | 0.10 | 0.0067 | 0.0007 | Rest | 550 | 10 | 500 | 300 | None | 12 |
| | 12 | 0.04 | 0.04 | 0.01 | 0.0008 | Rest | 550 | 10 | 500 | 300 | None | 12 |
| Comparative Example | 13 | 0.22 | 0.04 | 0.0011 | 0.0036 | Rest | 580 | 3 | 530 | 260 | None | 12 |
| | 14 | 0.02 | 0.01 | 0.0013 | 0.0018 | Rest | 580 | 3 | 530 | 260 | None | 12 |
| | 15 | 0.07 | 0.16 | 0.0024 | 0.0014 | Rest | 580 | 3 | 530 | 280 | None | 12 |
| | 16 | 0.06 | 0.08 | 0.03 | 0.0009 | Rest | 580 | 3 | 530 | 260 | None | 12 |
| | 17 | 0.08 | 0.09 | 0.0038 | 0.02 | Rest | 580 | 3 | 530 | 260 | None | 12 |
| | 18 | 0.04 | 0.05 | 0.0015 | 0.0008 | Rest | 580 | 3 | 450 | 260 | None | 12 |
| | 19 | 0.04 | 0.05 | 0.0015 | 0.0008 | Rest | 520 | 3 | 500 | 260 | None | 12 |
| | 20 | 0.02 | 0.04 | 0.0008 | 0.0007 | Rest | 580 | 0.5 | 530 | 280 | None | 12 |
| | 21 | 0.02 | 0.04 | 0.0008 | 0.0006 | Rest | 580 | 3 | 500 | 330 | None | 12 |

Next, each aluminum alloy foil was used to prepare a positive electrode material for a lithium-ion secondary battery. PVDF as a binder was added to an active material primarily containing $LiCoO_2$ to yield a positive electrode slurry. This positive electrode slurry was applied on both surfaces of the aluminum alloy foil with a width of 30 mm. Then, the resulting aluminum alloy foil was subjected to heat treatment for drying under three different conditions including 120° C. for 24 hours, 140° C. for 3 hours, and 160° C. for 15 minutes. After that, a roller press machine was used to perform compression forming to increase the density of the active material.

Each aluminum alloy foil as so manufactured was used to measure and evaluate: the tensile strength, 0.2% yield strength, electrical conductivity, and solid solution content; the tensile strength and 0.2% yield strength after the heat treatment at 120° C. for 24 hours; the tensile strength and 0.2% yield strength after the heat treatment at 140° C. for 3 hours; and the tensile strength and 0.2% yield strength after the heat treatment at 160° C. for 15 minutes. Table 2 shows the results. In addition, occurrence of cut during the active material application step and the occurrence of detachment of active material was observed for each positive electrode materials. Table 3 shows the results.

TABLE 2

Aluminum Alloy Foil

| | No. | Original Sheet Strength Tensile Strength (N/mm²) | Original Sheet Strength 0.2% Yield Strength (N/mm²) | Electrical Conductivity (% IACS) | Solid Solution Content Fe (ppm) | Solid Solution Content Si (ppm) | Solid Solution Content Cu (ppm) | Heating at 120° C. for 24 Hours Tensile Strength (N/mm²) | Heating at 120° C. for 24 Hours 0.2% Yield Strength (N/mm²) | Heating at 140° C. for 3 Hours Tensile Strength (N/mm²) | Heating at 140° C. for 3 Hours 0.2% Yield Strength (N/mm²) | Heating at 160° C. for 15 Minutes Tensile Strength (N/mm²) | Heating at 160° C. for 15 Minutes 0.2% Yield Strength (N/mm²) |
|---|---|---|---|---|---|---|---|---|---|---|---|---|---|
| Example | 1 | 201 | 182 | 60.2 | 213 | 80 | 20 | 188 | 179 | 200 | 182 | 202 | 184 |
| | 2 | 197 | 178 | 60.4 | 203 | 497 | 13 | 185 | 176 | 196 | 177 | 197 | 177 |
| | 3 | 199 | 179 | 60.3 | 221 | 561 | 1 | 188 | 177 | 198 | 176 | 200 | 178 |
| | 4 | 203 | 184 | 60.7 | 207 | 142 | 9 | 201 | 182 | 200 | 181 | 202 | 181 |
| | 5 | 219 | 201 | 61.0 | 197 | 426 | 50 | 213 | 187 | 215 | 196 | 217 | 198 |
| | 6 | 200 | 182 | 61.6 | 162 | 358 | 21 | 195 | 181 | 198 | 184 | 199 | 183 |
| | 7 | 184 | 168 | 61.7 | 157 | 338 | 19 | 171 | 154 | 175 | 159 | 178 | 162 |
| | 8 | 202 | 182 | 61.6 | 154 | 445 | 58 | 194 | 177 | 197 | 179 | 199 | 183 |
| | 9 | 182 | 163 | 62.3 | 104 | 301 | 48 | 171 | 152 | 173 | 166 | 177 | 159 |
| | 10 | 194 | 179 | 61.8 | 117 | 768 | 67 | 183 | 168 | 186 | 173 | 189 | 172 |
| | 11 | 195 | 178 | 62.5 | 152 | 142 | 51 | 182 | 185 | 185 | 169 | 190 | 174 |
| | 12 | 193 | 175 | 62.3 | 185 | 284 | 78 | 181 | 183 | 185 | 168 | 188 | 171 |
| Comparative Example | 13 | 211 | 193 | 69.5 | 158 | 1879 | 8 | 208 | 192 | 206 | 191 | 202 | 189 |
| | 14 | 178 | 158 | 61.7 | 74 | 142 | 10 | 161 | 148 | 165 | 148 | 171 | 153 |
| | 15 | 206 | 185 | 59.2 | 218 | 502 | 18 | 188 | 180 | 203 | 182 | 204 | 184 |
| | 16 | 225 | 206 | 59.3 | 195 | 426 | 228 | 207 | 188 | 212 | 192 | 218 | 199 |
| | 17 | 189 | 174 | 59.6 | 125 | 558 | 25 | 171 | 152 | 176 | 180 | 180 | 167 |
| | 18 | 169 | 151 | 62.8 | 58 | 284 | 11 | 151 | 130 | 155 | 133 | 158 | 136 |
| | 19 | 175 | 157 | 62.4 | 57 | 145 | 7 | 158 | 139 | 181 | 142 | 162 | 141 |
| | 20 | 178 | 159 | 62.1 | 88 | 302 | 10 | 181 | 142 | 188 | 145 | 170 | 151 |
| | 21 | 164 | 147 | 62.3 | 48 | 113 | 6 | 142 | 122 | 148 | 129 | 148 | 130 |

TABLE 3

Positive Electrode Material

| | No. | Heating at 120° C. for 24 Hours Cut during Active-material-application Step | Heating at 120° C. for 24 Hours Detachment of Active Material | Heating at 140° C. for 3 Hours Cut during Active-material-application Step | Heating at 140° C. for 3 Hours Detachment of Active Material | Heating at 160° C. for 15 Minutes Cut during Active-material-application Step | Heating at 160° C. for 15 Minutes Detachment of Active Material |
|---|---|---|---|---|---|---|---|
| Example | 1 | No | No | No | No | No | No |
| | 2 | No | No | No | No | No | No |
| | 3 | No | No | No | No | No | No |
| | 4 | No | No | No | No | No | No |
| | 5 | No | No | No | No | No | No |
| | 6 | No | No | No | No | No | No |
| | 7 | No | No | No | No | No | No |
| | 8 | No | No | No | No | No | No |
| | 9 | No | No | No | No | No | No |
| | 10 | No | No | No | No | No | No |
| | 11 | No | No | No | No | No | No |
| | 12 | No | No | No | No | No | No |
| Comparative Example | 13 | No | No | No | No | No | No |
| | 14 | Yes | Yes | Yes | Yes | No | No |
| | 15 | No | No | No | No | No | No |
| | 16 | No | No | No | No | No | No |
| | 17 | No | No | No | No | No | No |
| | 18 | Yes | Yes | Yes | Yes | Yes | Yes |
| | 19 | Yes | Yes | Yes | Yes | Yes | Yes |
| | 20 | Yes | Yes | Yes | Yes | No | No |
| | 21 | Yes | Yes | Yes | Yes | Yes | Yes |

<Tensile Strength>

The tensile strength of the aluminum alloy foil which had been cut out in a direction of the rolling was measured with an Instron tension tester AG-10kNX, manufactured by Shimadzu Corporation. The measurement was performed under conditions with a test piece size of 10 mm×100 mm, at a chuck distance of 50 mm, and at a crosshead speed of 10 mm/min. In addition, in order to simulate the drying step, heat treatment at 120° C. for 24 hours, at 140° C. for 3 hours, or at 160° C. for 15 minutes was carried out. Then, the aluminum alloy foil was cut out in a direction of the rolling. After that, the tensile strength was measured in the same manner as in the above. The tensile strength of 180 MPa or higher was considered acceptable and the tensile strength of less than 180 MPa was determined as unacceptable. With regard to the tensile strength after the heat treatment at 120° C. for 24 hours, at 140° C. for 3 hours, or at 160° C. for 15 minutes, the tensile strength of 170 MPa or higher was considered acceptable and the tensile strength of less than 170 MPa was determined as unacceptable.

<0.2% Yield Strength>

Likewise, a tension test was conducted to determine 0.2% yield strength from a stress/strain curve. The 0.2% yield strength of 160 MPa or higher was considered acceptable and the 0.2% yield strength of less than 160 MPa was determined as unacceptable. With regard to the 0.2% yield strength after the heat treatment at 120° C. for 24 hours, at 140° C. for 3 hours, or at 160° C. for 15 minutes, the 0.2% yield strength of 150 MPa or higher was considered acceptable and the 0.2% yield strength of less than 150 MPa was determined as unacceptable.

<Electrical Conductivity>

With regard to electrical conductivity, electrical resistivity was measured by a four-terminal method, and was converted to electrical conductivity. The electrical conductivity of 60% IACS or higher was considered acceptable and the electrical conductivity of less than 60% IACS was determined as unacceptable.

<Solid Solution Content>

Solid solution content of Fe and Cu were measured as follows. 1.0 g of aluminum alloy foil and 50 mL of phenol were heated to 200° C. to dissolve the alloy, followed by addition of 100 mL of benzyl alcohol as an anti-caking agent. The intermetallic compound was separated by filtration, and the filtrate was measured by IPC atomic emission spectrometry.

The intermetallic compound thus separated by filtration was then dissolved by a mixed solution of hydrofluoric acid and hydrochloric acid. Subsequently, the filtrate was measured by ICP atomic emission spectrometry to obtain the amount of Si precipitated as an intermetallic compound. The solid solution content of Si was obtained by deducting the content of precipitated Si from the initial Si content.

<Whether or Not Cut Occurs During Active-Material-Application Step>

Whether or not a cut occurred in a positive electrode material applied during an active-material-application step was visually inspected. The case without a cut was considered acceptable, and the case with a cut was determined as unacceptable.

<Whether or Not Active Material Detaches>

The presence or absence of the active material detachment was visually inspected. When no detachment occurred, the case was considered acceptable. When at least some detachment occurred, the case was determined as unacceptable.

In Examples 1 to 12, there was no occurrence of the active material detachment or a cut during the active-material-application step. In addition, their electrical conductivity was high. Thus, good evaluation results were achieved. On the other hand, in Example 9 which performs intermediate annealing, electrical conductivity was sufficiently high, however, strength was somewhat low when compared with other Examples. In addition, when Examples 6 and 7 were compared, setting the end-point temperature of the hot rolling to be 285° C. or lower was found to increase the strength of the aluminum alloy foil.

In Comparative Example 13, the high content of Si resulted in insufficient electrical conductivity.

In Comparative Example 14, the low content of Fe and the low solid solution content of Fe resulted in insufficient strength before and after heat treatment at 120° C. for 24 hours, at 140° C. for 3 hours, or at 160° C. for 15 minutes, thereby causing cut during the active material application step and detachment of the active material.

In Comparative Example 15, the high content of Fe resulted in insufficient electrical conductivity.

In Comparative Example 16, the high content of Cu resulted in insufficient electrical conductivity.

In Comparative Example 17, the high content of Mn resulted in insufficient electrical conductivity.

In Comparative Example 18, the low starting temperature of the hot rolling resulted in low solid solution content of Fe, insufficient strength before and after heat treatment at 120° C. for 24 hours, at 140° C. for 3 hours, or at 160° C. for 15 minutes, thereby causing cut during the active material application step and detachment of the active material.

In Comparative Example 19, the low temperature of the homogenizing treatment resulted in low solid solution content of Fe, insufficient strength before and after heat treatment at 120° C. for 24 hours, at 140° C. for 3 hours, or at 160° C. for 15 minutes, thereby causing cut during the active material application step and detachment of the active material.

In Comparative Example 20, the short holding time for the homogenizing treatment resulted in low solid solution content of Fe, insufficient strength before and after heat treatment at 120° C. for 24 hours, or at 140° C. for 3 hours, thereby causing cut during the active material application step and detachment of the active material.

In Comparative Example 21, the high end-point temperature of the hot rolling resulted in recrystallization of the aluminum sheet after the hot rolling, insufficient strength before and after heat treatment at 120° C. for 24 hours, at 140° C. for 3 hours, or at 160° C. for 15 minutes, thereby causing cut during the active material application step and detachment of the active material.

The invention claimed is:

1. An aluminum alloy foil for electrode current collector, comprising:
 0.03 to 0.1 mass % (hereinafter mass % is referred to as %) of Fe, 0.01 to 0.1% of Si, 0.0001 to 0.01% of Cu, 0.0005 to 0.005% of Mn, with the rest consisting of Al and unavoidable impurities, wherein
 solid solution content of Fe is 100 ppm or higher,
 solid solution content of Si is 80 ppm or higher,
 solid solution content of Cu is 1 ppm or higher; and
 tensile strength of the aluminum alloy foil is 180 MPa or higher, 0.2% yield strength of the aluminum alloy foil is 160 MPa or higher, and electrical conductivity of the aluminum alloy foil is 60% IACS or higher, wherein
 the aluminum alloy foil is obtained by maintaining an aluminum alloy ingot comprising 0.03 to 0.1% of Fe, 0.01 to 0.1% of Si, 0.0001 to 0.01% of Cu, 0.0005% to 0.005% of Mn, with the rest consisting of Al and unavoidable impurities, at 550 to 620° C. for 1 to 20 hours, and subjecting the resulting ingot under a hot rolling with a starting temperature of 500° C. or higher and an end-point temperature of 255 to 300° C.

2. The aluminum alloy foil for electrode current collector of claim 1, wherein
the tensile strength and the 0.2% yield strength after performing either one of heat treatments of 24 hours at 120° C., 3 hours at 140° C. or 15 minutes at 160° C., is 170 MPa or higher and 150 MPa or higher, respectively.

* * * * *